July 16, 1957  F. R. HICKERSON  2,799,466
SOLENOID PILOT CONTROLLED PISTON VALVE
Filed April 9, 1956  2 Sheets-Sheet 1

FREDERICK R. HICKERSON
INVENTOR.

BY
AGENT

July 16, 1957 F. R. HICKERSON 2,799,466
SOLENOID PILOT CONTROLLED PISTON VALVE
Filed April 9, 1956 2 Sheets-Sheet 2

FREDERICK R. HICKERSON
INVENTOR.

BY William R. Wright Jr.
AGENT

United States Patent Office 2,799,466
Patented July 16, 1957

2,799,466
SOLENOID PILOT CONTROLLED PISTON VALVE

Frederick R. Hickerson, Newton, N. J.

Application April 9, 1956, Serial No. 576,862

8 Claims. (Cl. 251—30)

The present invention relates to valves for controlling the flow of a fluid through a fluid system. It relates more particularly to valves wherein the control of the fluid flow is achieved by means which may be remote from the location of the valve closure means but yet is simple, convenient to operate, durable and lightweight.

The present invention is useful as a valve in fluid systems wherein surety of operation is essential along with simplicity, lightness of weight and remote control. It is for these reasons particularly useful in connection with aircraft or other vehicles although its use is not necessarily limited to those fields.

It has been a difficult problem, concerning valves of this general category, to provide a valve having the above-mentioned attributes and yet one that is such that the forces upon its closure means will be so closely balanced that the closure means can be opened or closed without difficulty and without the need for large, strong and cumbersome devices to effect its operation. The present invention provides a valve closure means in which an unbalance is created, at the will of an operator at a remote location, to provide entirely adequate force to cause the valve to open or close readily, positively and efficiently. This is accomplished in the present invention by allowing the fluid line pressure to be applied across the seat or closure means of the valve in an unusual manner to keep it closed, and then uniquely relieving this pressure to effect its opening.

It is, therefore, an object of the present invention to provide a novel fluid control valve wherein fluid flow is prevented or allowed through remote control.

It is also an object of the present invention to provide a valve of the foregoing type wherein the operating pressure forces upon its closure means are balanced during its normal open and closed conditions and unbalanced to effect operation of the closure means.

It is another object of the present invention to provide such a valve wherein its remote control means is electrically operated.

It is also an object to provide a novel and unusual venting mechanism and arrangement for a valve of the foregoing type.

It is still another object of the present invention to provide a novel and useful fluid control valve in accordance with the previously stated objects which is positive and foolproof in operation, simple to construct, safe in operation, durable and lightweight.

Other objects and advantages of the present invention will be apparent from the description which follows.

Figure 1:
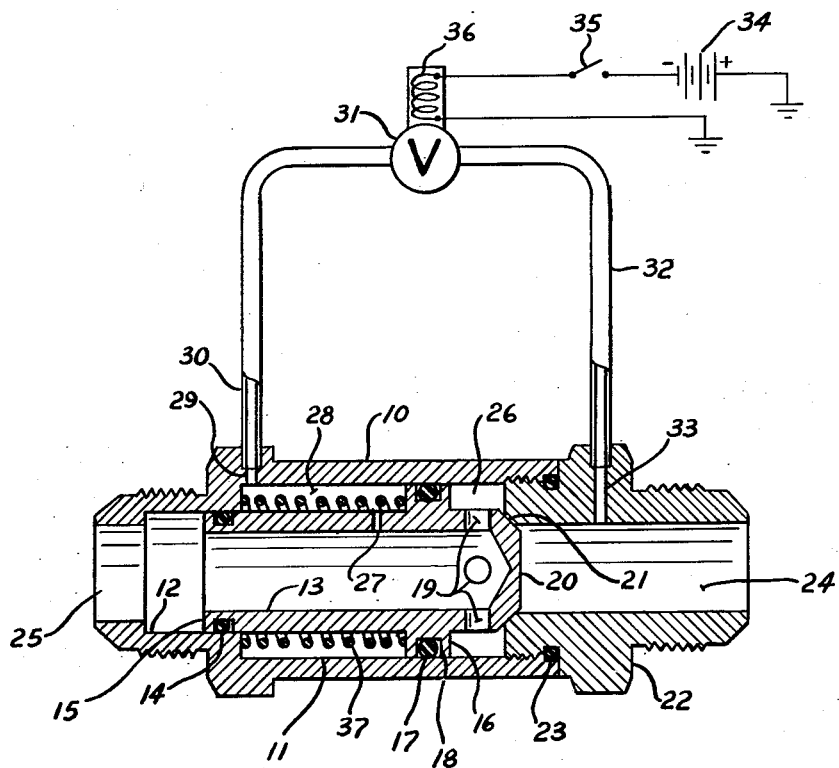
Figure 1 is a cutaway cross-sectional longitudinal view of the valve showing the interior of the valve in its closed position and its means for remote operation.

With reference to Figure 1, a valve body 10 is provided with two adjoining, concentric, cylindrical bores or barrels 11 and 12. While these are referred to herein as bores, it is not intended that they necessarily must be made solely by means of machine boring since any other suitable form of machining, die-casting, honing or the like may be used for this purpose if desired. It is instead intended simply to identify these parts of the present invention through the use of this term.

A hollow piston 13 is located in bore 12 and is slidable therein, there being an O-ring type seal 14 set in a groove 15 near the end of piston 13 to effect a sliding seal between bore 12 and piston 13. Piston 13 extends outward from bore 12 into bore 11, which is of larger diameter than bore 12, and an integral annular shoulder 16 is provided on piston 13 which fits larger bore 11 and is easily slidable therein. An O-ring seal 17 is provided in a suitable groove in shoulder 16 to effect a fluid seal between bore 11 and shoulder 16 and its integral piston 13. To the right of shoulder 16 in Figure 1, are shown ports 19 which extend through the wall of piston 13 in the manner shown to allow communication between the interior of piston 13 and chamber 26. It will also be seen that piston 13 has a closed end or head 20 which is in the form of an annular conical seat 21 which seats upon a mating surface formed in outlet plug 22. Plug 22 is screwed tightly into the end of body 10 in the manner shown with a fluid seal or gasket 23 between the body 10 and plug 22 to preclude leakage. An outlet passage 24 is provided in outlet plug 22 and extends throughout the length of it as shown. At the opposite end of body 10, a fluid inlet 25 is provided which opens into bore 12 as shown.

Since piston 13 is hollow throughout its length except for its closed end 20, fluid entering the valve through inlet 25 will pass into the interior of piston 13 and out through its ports 19 into the chamber 26 defined by shoulder 16, bore 11, plug 22 and piston 13.

In addition to ports 19 through the wall of piston 13, an orifice 27 is provided through the skirt of piston 13 on the side of shoulder 16 opposite to ports 19 and between the seals 17 and 14. The space or chamber 28 is thus in communication through this orifice with the interior of piston 13 and the fluid inlet 25. A passage or conduit 29 passes through the wall of body 10 and is in communication with chamber 28 and with a pipe 30 fastened in it in any suitable manner and extending outward from body 10. Pipe 30 feeds into a common, normally-closed, electrically-operated, shut-off valve 31 from which pipe 32 leads into passage 33 in outlet plug 22 to communicate with valve outlet 24. A grounded battery 34 supplies electric current through switch 35 to solenoid coil 36 with the electrical circuit completed to battery 34 through a ground connection. Passage 29 and the pipe system connected thereto is designed and proportioned to have less pressure drop than that of orifice 27 for reasons explained later in this specification.

In operation, fluid, either liquid or gaseous, enters the valve through inlet 25 and passes into bore 12 and the interior or piston 13, seal 14 preventing leakage between piston 13 and bore 12. From the interior of piston 13, the fluid passes through ports 19 into annular chamber 26, through orifice 27 into annular chamber 28 and thence into pipe 30 to valve 31. Due to the fluid pressure exerted upon piston 13 it will press its conical seat 21 against its mating surface in outlet plug 22 to prevent flow into the outlet 24. A light helical compression spring 37 in annular chamber 28 aids piston 13 to stay in this position even though no pressure is applied to the system, but its force is negligible compared to the pressure forces on the valve piston and body during actual operation in a fluid system and its effect can be neglected in the pressure operation of the valve. The pressure forces upon opposite sides of the operating means or shoulder 16 are equal and balanced.

In order to operate the valve, it is necessary that piston 13 be moved away from its seat on plug 22 to allow flow to occur through the valve and the fluid system of which it is a part. This is accomplished by the operation of electric valve 31 which is actuated by the closure of switch 35 to supply electric current from grounded battery 34 to the solenoid coil 36 thereby energizing it and causing valve 31 to open. This action allows fluid to flow under pressure from pipe 30 through pipe 32 into the low pressure area of outlet 24, thus relieving the pressure in the conduit or pipe system, and, since the pressure drop in the pipe system is less than that of orifice 27, reducing the pressure in chamber 28. Because of this reduction in pressure in chamber 28, an unbalanced force to the left in the figure, i. e. away from the valve seat, greater than that to the right in the figure will exist on piston 13 and it will move away from its seat. The unbalanced force is created since the area of shoulder 16 is now not opposed with an equal force from the pressure in chamber 28 and the pressure force on it is sufficient to overcome the forces on piston 13 toward the seat, including the force of spring 37, the piston 13 and shoulder 16 being so proportioned that the projected area of the shoulder 16 acted upon by the fluid pressure forces is substantially greater than that of piston 13 including the force of spring 37.

In order that piston 13 may be returned to its seat and flow thus stopped, valve 31 is allowed to close by the opening of switch 35 which breaks the electrical circuit to solenoid 36 thus deenergizing it and permitting the normally-closed valve to assume its normal position to prevent flow through pipes 30 and 32. This action allows fluid pressure to build up again in chamber 28 as fluid enters it from the interior of piston 13 through orifice 27 and this pressure then exerts its force again upon shoulder 16 in equal amount to that exerted upon it from chamber 26, and, because of the other forces still acting upon piston 13, including that of spring 37, piston 13 will be forced to its seat and the flow of fluid will be stopped.

Figure 2:
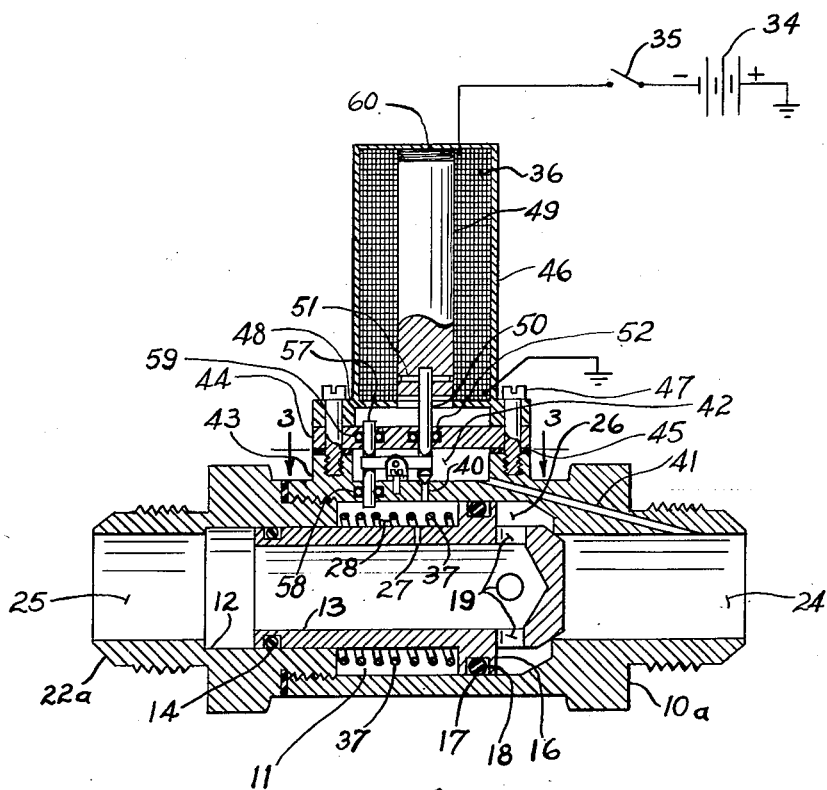
Figure 2 is a cutaway cross-sectional longitudinal view of the valve showing its interior and an alternate arrangement for allowing its remote control.
Figure 3:
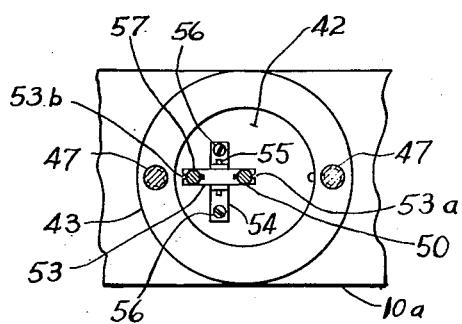
Figure 3 is a view taken on line 3—3 of Figure 2.

In Figure 2, another arrangement of the present invention is shown in which the operation of the valve itself is identical with that shown in Figure 1 except, that the means of venting chamber 28 is accomplished by the inclusion of an electrically-operated valve attached directly to the body of the main valve and, that ingenious means is applied to assist the electrically-operated valve to close. Also, no external pipes are employed with this arrangement.

From Figure 2, it will be seen that the piston and body arrangement are identical with Figure 1 except that an inlet plug is provided instead of an outlet plug in order that a longer passage can be employed instead of passage 33, and that the upper part of the body is of a different configuration to accommodate the directly-attached control or pilot valve. Also, an additional hole and a seal are provided in the body wall at chamber 28 to accommodate a plunger to be described in the paragraphs to follow.

As mentioned in the previous paragraph, piston 13 is again utilized, and it, including its shoulder 16, are slidable in bores 11 and 12 as shown in Figure 2. This arrangement is identical with that of Figure 1 except that bore 12 is located in an inlet plug 22a while bore 11 is located in body 10. Plug 22a is threaded into body 10a and a gasket or seal 38 serves to make the joint fluid tight. A valve seat 39 is formed in body 10a to bear against face 21 of piston 13 to co-operate with it to act as a closure means. Seals 14 and 17, ports 19, orifice 27, spring 37, and chambers 26 and 28 are again provided as in Figure 1 and operate in the same manner as previously described. A hole or orifice 40 is provided in the wall of body 10 at a point where it will at all times communicate with chamber 28 while a passage 41 passes through body 10a to effect communication between outlet 24 and the interior of chamber 42 formed by circular boss 43 and cover 44. A gasket or seal 45 is located between boss 43 and cover 44 to prevent leakage. Atop cover 44 is mounted a solenoid coil 36 having a shell or retainer 46 on its exterior held in place on cover 44 and boss 43 by means of screws 47. A vent 48 is provided to allow for the escape of any trapped air.

Figure 4:
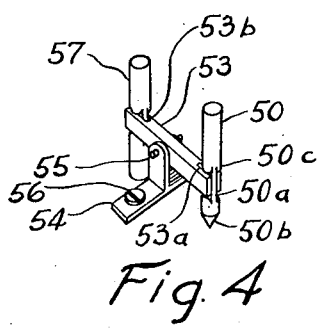
Figure 4 is an isometric view of the pilot valve assembly of Figure 2.

A slidable iron core 49 is located in the center of solenoid coil 36 and to it is attached pintle 50 held in place by pin 51. Pintle 50 passes downward through cover 44 through a suitable hole and fluid-tight seal 52, and with its pointed end or valve seat 50b seats on the rim or valve seat of passage 40. With reference to Figure 4, pintle 50 has a flatted portion 50a part way up its length and below seal 52. Flatted portion 50a fits freely into slot 53 of a beam 53 with the rounded shoulders 50c of pintle 50 adjacent flatted portion 50a bearing on the upper and lower surfaces of beam 53. Beam 53 is pivotally attached to bracket 54 by pivot pin 55, and bracket 54 is attached to body 10a by screws 56.

A plunger 57 is located at the opposite end of beam 53 from pintle 50 and is fitted in a slot 53b in the same manner as previously described for pintle 50. Plunger 57 extends upward through cover 44 and downward through body 10a into chamber 28 and passes through O-ring type seals 59 and 58, respectively, which serve to prevent leakage of fluid. Plunger 57 is of the same diameter as pintle 50 and is, of course, of larger diameter than orifice 40. Also, it is substantially parallel to the longitudinal axis of pintle 50.

The valve arrangement shown in Figure 2 basically operates in exactly the same manner as that shown in Figure 1 except that chamber 28 is vented into the outlet by direct action of the movement of solenoid core 49 and all conduit passages are internal of the valve. To set the valve in operation, remote switch 35 is closed to supply electric current from battery 34 to solenoid coil 36 thus energizing it and causing core 49 to be pulled upward, thus compressing spring 60 and causing attached pintle 50 to be lifted from its seat on the rim of orifice 40. This action allows fluid from chamber 28 to flow through orifice 40 into chamber 42 from which it is free to enter passage 41 and will pass through it into outlet 24. Orifice 40 and passage 41 are so proportioned as to have less pressure drop than orifice 27 of piston 13, so that the pressure in chamber 28 will drop and will allow piston 13 to be forced from its seat by the pressure on the opposite side of its shoulder 16 as previously described for Figure 1. To close the valve, switch 35 is opened thus de-energizing coil 36 and allowing spring 60 to urge core 49 downward until the conical seat of pintle 50 reseats on the rim of orifice 40 to stop the flow therethrough. This action allows pressure to build up again in chamber 28 and when it becomes equal to that in chamber 26, the main valve closure means will close.

Plunger 57 and the walking beam mechanism comprising members 53, 54, 55 and 56 serve the purpose of helping spring 60 keep pintle 50 on its seat on the rim of orifice 40 during periods when the solenoid coil 36 is not energized. From Figure 2, it will be seen that the fluid pressure existent in chamber 28 will be exerted on the exposed end of plunger 57 as well as on the smaller area of pintle 50 exposed by orifice 40. Plunger 57 will be urged upward thus causing it to exert an upward force on its end of beam 53, which due to its pivot 55 attempts to tilt or "walk" and thus creates a downward force on pintle 50 and causes pintle 50 to seat more firmly on its seat on the rim of orifice 40. If pintle 50 is away from its seat, as it will be during periods when the coil 36 is energized, plunger 57 and beam 53 will not affect nor interfere with its proper action since the cross-sectional area of plunger 57 and then exposed cross-sectional area of pintle 50 will be equal and balanced.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A piloted valve for controlling the flow of pressurized fluid comprising cylindrical concentric adjoining bores with one bore of larger diameter than the other, an annular hollow piston having an open upstream end and being slidable in the smaller of the bores, sealing means therebetween, a closed head for the other end of said piston, an annular shoulder on said piston slidable in the bore of larger diameter with sealing means therebetween, an annular valve seat in said body, a co-operating valve seat on the closed head of said piston, at least one port through the wall of said piston between its closed head and its shoulder, at least one orifice through the wall of said piston connecting its interior with the chamber between the piston and larger diameter bore on the upstream side of said shoulder, an outlet from the body at the seat end of the body and an inlet at the opposite end, conduit means connecting said chamber with the outlet, valve means normally closing said conduit means, and means for opening said valve means, said conduit means being larger in cross-section than said orifice whereby said conduit has less pressure drop than said orifice.

2. The invention set forth in claim 1 wherein the valve means for the conduit means comprises an electrically-operable valve in said conduit means.

3. The invention set forth in claim 2 wherein the valve means comprises an electrically-operable solenoid, a sliding core within the solenoid, a pintle attached to said core, a valve seat on the end of said pintle, and a co-operating valve seat in said conduit means.

4. The invention set forth in claim 3 including a plunger slidably extending through a bore in the body into the upstream side of said chamber, and a walking beam having one end adapted to be pushed upward by the plunger and its other end adapted to push downward on said pintle, whereby pressure upon the end of said plunger in said space urges said plunger upward and causes said walking beam to push said pintle downward firmly against its seat in said conduit means.

5. The invention set forth in claim 1 with said conduit means comprising a port in the wall of the body, an enclosed chamber, and at least one passage from said chamber communicating with the outlet from the body.

6. The invention set forth in claim 1 with said conduit means comprising a pipe connecting the said chamber with the outlet of the valve and valve means in said pipe for allowing or permitting flow therethrough.

7. The invention set forth in claim 6 with the valve means comprising an electrically-operable valve.

8. The invention set forth in claim 1 with a helical compression spring surrounding a portion of said piston in that manner as to urge said piston toward the valve seat.

References Cited in the file of this patent
UNITED STATES PATENTS

| | | |
|---|---|---|
| 1,571,396 | Darrow | Feb. 2, 1926 |
| 2,329,001 | Robinson | Sept. 7, 1943 |